(12) United States Patent
Gutta

(10) Patent No.: US 7,260,309 B2
(45) Date of Patent: Aug. 21, 2007

(54) TRACKING OF PARTIALLY VIEWED SHOWS SO THAT THEY CAN BE MARKED FOR DELETION WHEN A PERSONAL VIDEO RECORDER RUNS OUT OF SPACE

(75) Inventor: Srinivas Gutta, Yorktown Heights, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 869 days.

(21) Appl. No.: 10/290,125

(22) Filed: Nov. 7, 2002

(65) Prior Publication Data

US 2004/0091235 A1    May 13, 2004

(51) Int. Cl.
*H04N 5/91*    (2006.01)
(52) U.S. Cl. ......................... 386/46; 386/125
(58) Field of Classification Search .................. 386/46, 386/83, 95, 117, 125, 126; 707/204, 206; 711/161, 162, 171
See application file for complete search history.

(56) References Cited

U.S. PATENT DOCUMENTS

| 4,947,265 A | 8/1990 | Hayashi et al. |
| 5,867,226 A | 2/1999 | Wehmeyer et al. |
| 5,889,915 A | 3/1999 | Hewton |
| 6,609,186 B1* | 8/2003 | Veres et al. .................. 711/171 |
| 6,636,953 B2* | 10/2003 | Yuasa et al. .................. 711/161 |
| 6,707,982 B2* | 3/2004 | Suda ............................ 386/46 |
| 6,920,281 B1* | 7/2005 | Agnibotri et al. ........... 386/125 |
| 2002/0012517 A1 | 1/2002 | Ichioka et al. ................ 386/46 |
| 2002/0049710 A1 | 4/2002 | Kusumoto ..................... 707/1 |
| 2002/0057893 A1 | 5/2002 | Wood et al. .................. 386/46 |

FOREIGN PATENT DOCUMENTS

| EP | 1091358 A2 | 4/2001 |
| WO | WO0001149 | 1/2000 |
| WO | WO0059223 | 10/2000 |
| WO | 0203682 A2 | 1/2002 |

* cited by examiner

*Primary Examiner*—James J. Groody
*Assistant Examiner*—Christopher Onuaku

(57) ABSTRACT

A method for managing a plurality of video data stored on a storage device. The method including the steps of: determining whether sufficient storage space remains on the storage device to store a desired video content; if sufficient storage space does not exist on the storage device to store the desired video content, determining whether any video content of the plurality of video data stored on the storage device has been partially viewed; and if video content stored on the storage device has been partially viewed, deleting the partially viewed video content to make room for storage of the desired video content on the storage device.

20 Claims, 4 Drawing Sheets

TRACKING OF PARTIALLY VIEWED SHOWS SO THAT THEY CAN BE MARKED FOR DELETION WHEN A PERSONAL VIDEO RECORDER RUNS OUT OF SPACE

BACKGROUND OF THE INVENTION

1. Field of the Invention

The present invention relates generally to storage devices for video content, such as, personal video recorders, and more particularly, to deletion of stored video content on the PVR if a particular video content has been partially viewed and not been tagged not to be deleted.

2. Prior Art

Personal video recorders (PVR's) have become very popular in recent years for recording video content, such as television broadcasts, for later viewing by a viewer. Examples of PVRs are those manufactured by TiVo and Panasonic ("Replay TV"). Although such PVRs have large storage devices, typically a hard drive, the number of television broadcasts or other video content that can be stored is not limitless. Therefore, either the viewer must manually delete stored video data on the storage device or the PVR must have an automatic scheme to do so. Typically, the PVR automatically deletes video data when a need arises according to the FIFO (First In First Out) deletion scheme. That is, the video content that has been stored for the longest time is the first to be deleted if there is not enough storage space to store new video content.

Although a viewer can indicate that a particular video content not be deleted (e.g., locked), the FIFO deletion scheme is arbitrary and does not necessarily reflect a viewers preference for deleting video content from the plurality of video data stored on the storage device that he/she no longer has interest in viewing or never had interest in viewing.

SUMMARY OF THE INVENTION

Therefore it is an object of the present invention to provide a method for managing the deletion of video content on a storage device that overcomes the disadvantages associated with the prior art.

Accordingly, a method for managing a plurality of video data stored on a storage device is provided. The method comprising: (a) determining whether sufficient storage space remains on the storage device to store a desired video content; (b) if sufficient storage space does not exist on the storage device to store the desired video content, determining whether any video content of the plurality of video data stored on the storage device has been partially viewed; and (c) if video content stored on the storage device has been partially viewed, deleting the partially viewed video content to make room for storage of the desired video content on the storage device.

If it is determined that no video content stored on the storage device has been partially viewed, the method preferably further comprises deleting video content of the plurality of video data which was first stored on the storage device until there is sufficient space on the storage device to store the desired video content.

The method preferably further comprises storing the desired video content after deleting of the partially viewed video content.

The method preferably further comprises repeating steps (b) and (c) until there is sufficient space on the storage device to store the desired video content.

The method preferably further comprises tagging video content which has been partially viewed with an indication identifying the video content as partially viewed. In which case, the determining of whether any video content of the plurality of video data stored on the storage device has been partially viewed preferably comprises searching the plurality of video data for the tagged video content. Preferably, the partially viewed video content is further date tagged indicating a date on which the video content was partially viewed, wherein the deleting comprises: ordering the partially viewed video content in sequential order according to their corresponding date tag; and deleting the partially viewed video content having the oldest date tag. In which case the method further comprises repeating the deleting of the partially viewed particular video content having the oldest date tag until there is sufficient space on the storage device to store the desired video content.

Where the video content which has been partially viewed is tagged with an indication identifying the video content as partially viewed, the partially viewed video content is preferably further recommender tagged indicating a likelihood that a viewer would enjoy viewing the partially viewed video content, wherein the deleting comprises: determining whether the partially viewed video content has a positive recommendation from the recommender tag; and deleting the partially viewed video content having a recommender tag indicating the viewer would be unlikely to enjoy viewing thereof. Preferably, the recommender tag indicates a recommender score and wherein the determining of whether the partially viewed video content has a positive recommendation comprises determining whether the recommender score is greater than a predetermined threshold score.

Where the video content which has been partially viewed is tagged with an indication identifying the video content as partially viewed, the method preferably further comprises prompting a viewer after termination of the partially viewed video content if the partially viewed video content should be tagged not to be deleted. In which case, the deleting of the partially viewed video content to make room for storage of the desired video content on the storage device preferably comprises: determining whether the partially viewed video content has been tagged not to be deleted; and deleting partially viewed video content to make room for storage of the desired video content on the storage device only if the partially viewed video content has not been tagged not to be deleted.

Also provided is a personal video recorder comprising: a storage device for storing video data, the video data comprising a plurality of video content; and a processor for retrieving one of the plurality of video content from the storage device for viewing, determining whether the viewed video content is partially viewed, and tagging the viewed video content as being partially viewed.

The personal video recorder preferably further comprises means for indicating storage of a desired video content, wherein the processor further determines whether there is sufficient storage space on the storage device to store the desired video content and if there is not enough storage space to store the desired video content, deletes the partially viewed video content.

Preferably, the processor further tags the partially viewed video content with a tag indicating a date on which the video content was partially viewed, orders the partially viewed video content in sequential order according to their corresponding date tag, and if there is not enough storage space to store the desired video content, deletes the partially viewed video content having the oldest date tag. The processor preferably further tags the partially viewed video content with a recommendation indicating a likelihood that a viewer would enjoy viewing the partially viewed video content, determines whether the partially viewed video content has a positive recommendation from the recommender tag, and deletes the partially viewed video content having a recommendation tag indicating the viewer would be unlikely to enjoy viewing thereof. The processor further prompts a viewer after termination of the partially viewed video content if the partially viewed video content should be tagged not to be deleted and the personal video recorder further comprises means for indicating whether the partially viewed video content should be tagged not to be deleted.

Also provided are a computer program product for carrying out the methods of the present invention and a program storage device for the storage of the computer program product therein.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Although this invention is applicable to numerous and various types of devices for storing video data, it has been found particularly useful in the environment of a personal video recorder which stores video content such as television broadcasts. Therefore, without limiting the applicability of the invention to a personal video recorder which stores video content such as television broadcasts, the invention will be described in such environment.

Figure 1:
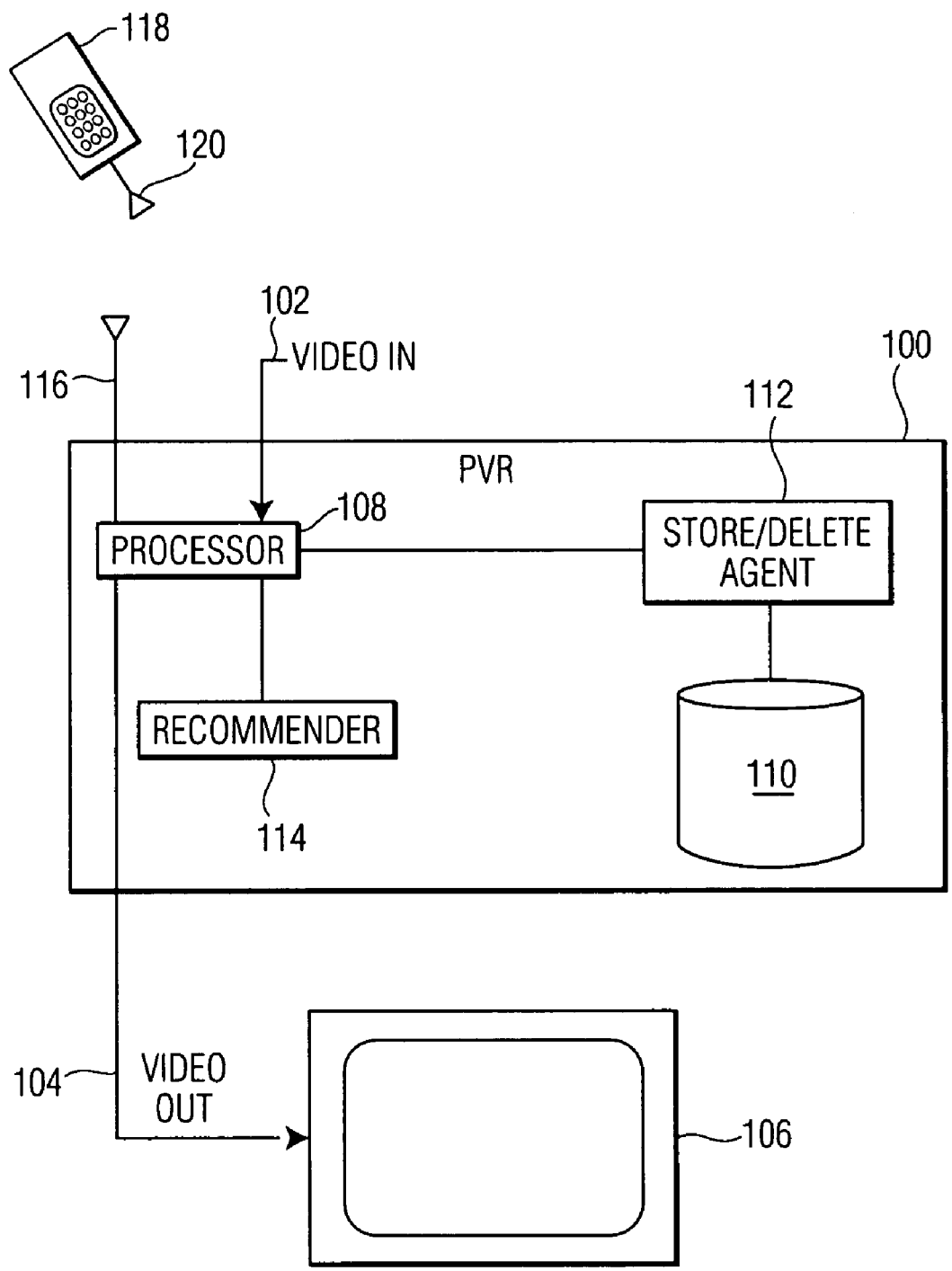
FIG. 1 illustrates a schematic view of a preferred implementation of a personal video recorder of the present invention that supplies a video signal to a monitor.

Referring now to FIG. 1, a video storage device, such as a personal video recorder is shown therein, the personal video recorder being generally referred to by reference numeral 100. The PVR 100 accepts a video input signal 102 and outputs the same 104 to a viewing means, such as a monitor 106. The PVR 100 can be configured as a "set-top" box as illustrated, disposed remotely from the monitor 106, or integrated with the monitor 106. The PVR 100 has a central processor 108 for controlling components thereof and carrying out instructions contained on hardware or software in the PVR 100 or remote therefrom. The PVR 100 has a storage device 110, such as a hard drive, for storing video data thereon. The video data comprises a plurality of video content such as television, cable, Internet, cellular, and/or satellite broadcasts and/or video on demand transmissions. The storage device 110 is under the control of a store/delete agent 112 which instructs the storage device to delete of store certain video content. The store/delete agent 112 is under the control of the processor 108, and may be formed integrally therewith. In addition to the typical function of the processor 108 for a typical PVR, the added functionality of the processor 108 will be described below in detail with regard to the methods of the present invention.

The PVR also preferably contains a recommender 114 for recommending certain video content to a viewer. Recommenders are well known in the art and can provide a yes/no recommendation or a recommendation score based on the viewing habits of the viewer. The PVR also preferably has means for accepting data or instructions, such as a receiver 116 for receiving a wireless transmission from a remote control 118 having a transmitter 120. The processor 108 includes components, such as a demodulator (not shown) for receiving the wireless transmission, which may be RF or infrared signals, and converting such signals into instructions readable by the processor 108. The means for accepting data or instructions preferably works with an onscreen menu displayed on the monitor 106, as is known in the art.

Figure 2:
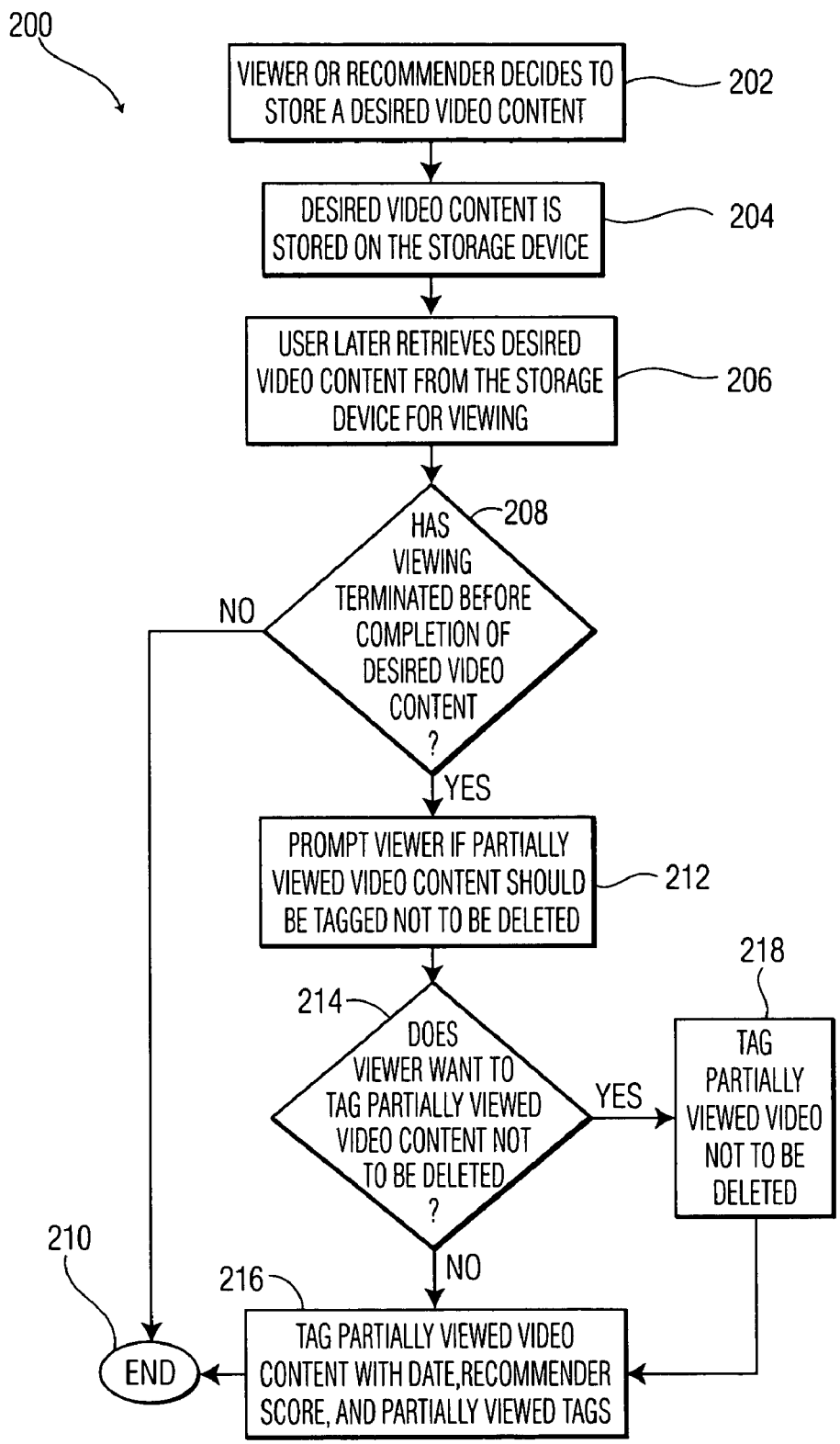
FIG. 2 illustrates a flowchart of a preferred implementation of a method for tagging partially viewed video content.

The methods of the present invention will now be described with reference to FIGS. 2, 3A, and 3B. Referring first to FIG. 2, there is illustrated a flowchart showing a preferred implementation of a method for tagging partially viewed video content. At step 202, either a viewer instructs the PVR 100 to store a desired video content, such as a video movie from a cable broadcast signal 102, or the recommender 114 decides, based on the previous viewing habits of the viewer, to store the desired video content on the storage device 110. In the case of the viewer instructing the PVR 100 to store the desired video content, the viewer operates the remote control 118 to input the instruction or operates a button (not shown) on the PVR itself. The signal from the remote control 118 or button (not shown) is input into the processor 108, which in turn instructs the store/delete agent 112 to store the desired video content. Typically, the store/delete agent 112 assigns a portion of the storage device 110 where the desired video content is stored and where it can later be retrieved and stores the desired video content at the assigned portion at step 204.

At step 206, when the viewer later decides that he/she wants to view the desired stored video content and instructs the PVR 100, preferably, through the remote control 118, the desired video content is retrieved from the storage device 110 and is output as an output signal 104 to the monitor 106 for viewing by the viewer. The processor 108 monitors the viewing of the desired video content to determine if the same is only partially viewed at step 208. That is, the processor 108 determines if viewing of the desired video content has terminated before completion of the same. Video content, such as movies and music videos are stamped with a running time, therefore the determination in step 208 is preferably accomplished by counting down a clock (preferably integral with the processor 108). If the clock has any time left when the operation of the PVR 100 is stopped or if the monitor 106 is powered off or its display is changed to view another video content, the processor 108 decides that the desired video content has been partially viewed (shown schematically as step 208-YES). Alternatively, the clock does not have to count down to zero for the processor to determine that the desired video content has been totally viewed, if a predetermined amount of the desired video content has been viewed, for example 98%, the processor 108 can also determine that the desired video content has been totally viewed. Thus, if less than the predetermined amount has been viewed, the processor 108 will determine that the desired video content has been partially viewed.

If it is determined that the desired video content has been totally viewed (or a significant portion thereof has been viewed), the method proceeds along path 208-NO to step 210 where the method ends. However, if it is determined that the desired video content has been partially viewed, the method proceeds along path 208-YES to step 212. At step 212, the viewer is prompted upon the stoppage in viewing of the desired video content if the same should be tagged as not to be deleted (alternatively referred to herein as "locked"). The prompt is preferably displayed on the monitor 106 and the viewer responds by inputting an instruction, preferably with the remote control 118. At step 214, it is determined whether the user inputs an instruction for the desired video content that has been partially viewed to be locked. If the viewer indicates that the desired video content is not to be locked (shown schematically as step 214-NO), the desired video content is tagged at step 216 with an identifier indicating the desired video content has been partially viewed. If the viewer indicates that the desired video content is to be locked (not to be deleted), the desired video content is tagged "not to be deleted" at step 218 before being tagged partially viewed at step 216. After the desired video content is appropriately tagged, the method ends at step 210.

The methods of the present invention are particularly suited to be carried out by a computer software program, such computer software program preferably containing modules corresponding to the individual steps of the methods. Such software can of course be embodied in a computer-readable medium, such as an integrated chip or a peripheral device.

Figure 3A:
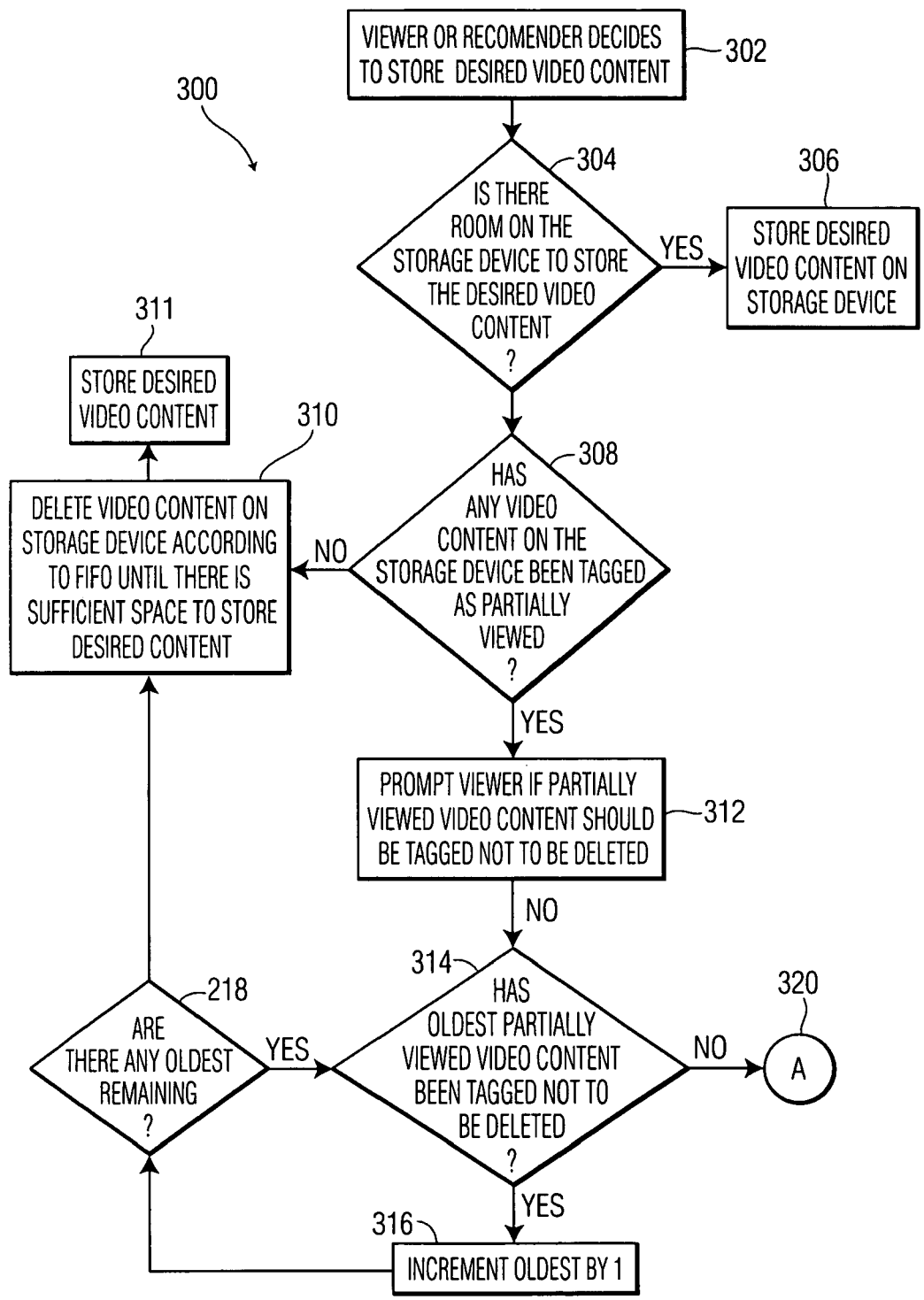
FIGS. 3A and 3B illustrates flowcharts of preferred implementation of a method for managing the storage and deletion of video content on a storage device, such as a hard drive of a personal video recorder.
Figure 3B:
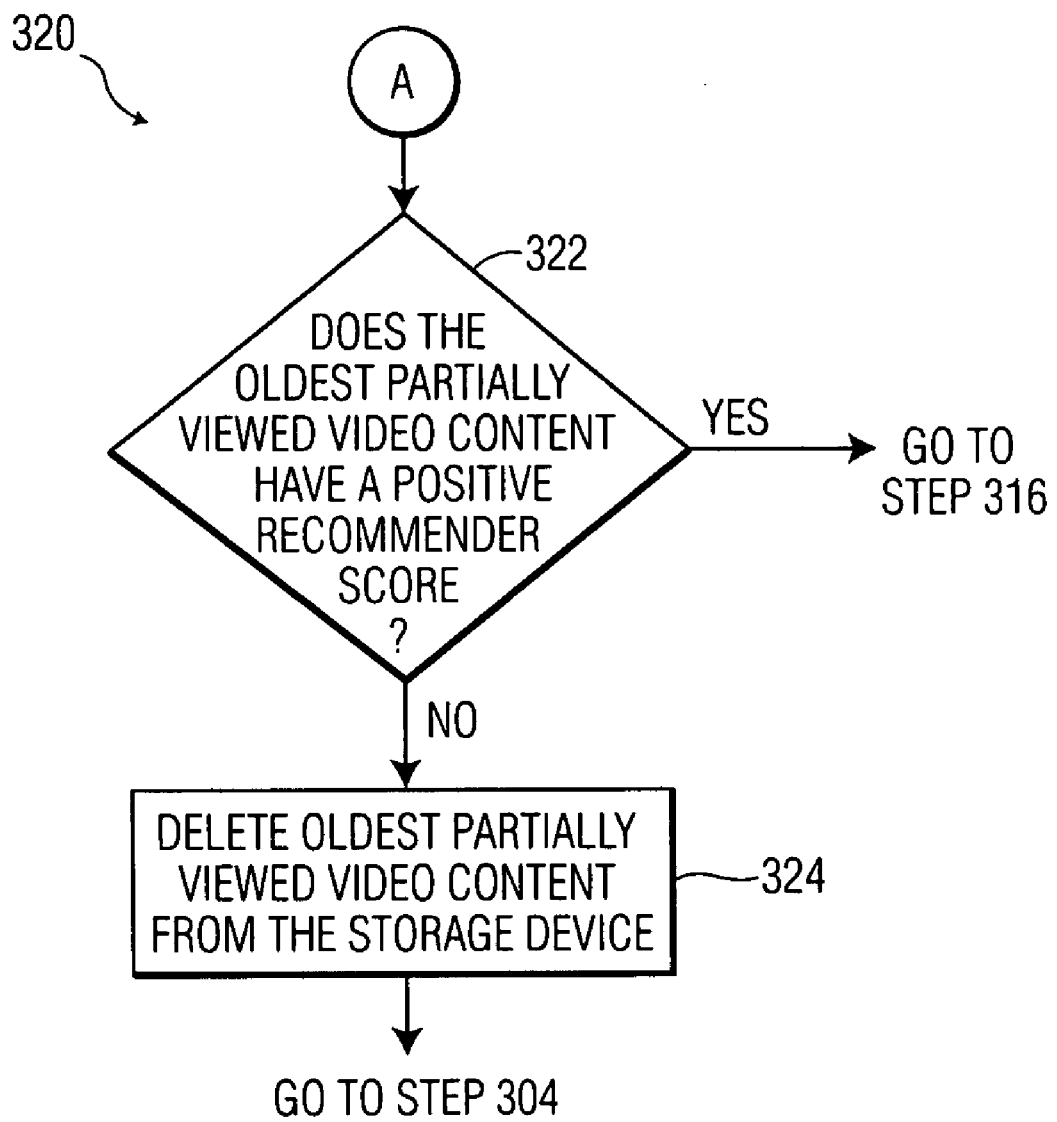

Referring now to FIGS. 3A and 3B, there is illustrated a flowchart showing a preferred implementation of a method for managing the storing and deleting of video data on the storage device 110, the method being generally referred to by reference numeral 300. As in step 202, at step 302, either a viewer instructs the PVR 100 to store a desired video content, such as a video movie from a cable broadcast signal 102, or the recommender 114 decides, based on the previous viewing habits of the viewer, to store the desired video content on the storage device 110. At step 304, it is determined if there is sufficient storage space on the storage device 110 to store the desired video content. If there is sufficient storage space remaining on the storage device 110 to store the desired video content, the method proceeds along path 304-YES to step 306, where the processor and store/delete agent provide the necessary instructions to store the desired video content on the storage device 110.

If it is determined that there is not enough storage space on the storage device 110 to store the desired video content, the method proceeds along path 304-NO to step 308. At step 308, it is determined whether any video content on the storage device 110 has been tagged as partially viewed. After searching the storage device 110 for the partially viewed tag, if none of the video content on the storage device 110 has been tagged as partially viewed, the method proceeds along path 308-NO to step 310 where a deletion scheme is carried out to delete video content in order to free up storage space for storing the desired video content. Although many such deletion schemes now known or later developed can be implemented without departing from the scope or spirit of the present invention, the FIFO deletion scheme is preferred. After video content has been deleted from the storage device 110 to free up storage space for the desired video content, the desired video content is stored on the storage device 110 at step 311.

If video content on the storage device 110 has been tagged as being partially viewed, the method proceeds along path 308-NO to step 312. Although many schemes are possible for choosing which of the partially viewed video content is to be deleted first, it is preferred to delete the oldest partially viewed video, as will now be described with reference to steps 312-318. At step 312, all of the video content on the storage device 110 which have been tagged as being partially viewed are sequentially ordered from newest to oldest according to the date tag described above, and the oldest is assigned a numerical value of 1. At step 314, it is determined if the oldest partially viewed video content has been further tagged not to be deleted (or locked). If the oldest partially viewed video content has been tagged not to be deleted, the method proceeds along path 314-YES to step 316, where the oldest partially viewed video content is incremented by 1 to equal the next oldest partially viewed video content in the sequence.

At step 318, it is determined whether any oldest remain in the sequence, i.e., it is determined whether there are any other partially viewed video content remaining on the storage device 110. If there are no more partially viewed video content remaining, the method proceeds along path 318-NO to steps 310 and 311 where a deletion scheme, such as FIFO is used to delete video content on the storage device 110 and to store the desired video content, respectively. If it is determined that there are more partially viewed video content remaining in the sequence, the method proceeds along path 318-YES and the loop pf steps 314, 316, and 318 repeats until the sequence of partially viewed video content is completed (318-NO) or if any of the partially viewed video content in the sequence has not been tagged for locking, in which case the method proceeds along path 314-NO to routine 320.

Although, it is preferred to prompt the viewer to determine if a partially viewed video content should be tagged not to be deleted, those skilled in the art will appreciate that the method 300 can delete the partially viewed video content without such a determination. However, partially viewing a video content may not always indicate a dislike for the video content. For instance, viewing of a video content can be terminated before completion thereof for reasons unrelated to whether or not the same is liked or disliked by the viewer, such as due to an emergency or simply because the viewer is tired or has a greater desire to view or do something else.

Referring now to FIG. 3B, routine 320 is shown therein. At step 322, it is determined if the oldest partially viewed video content in the sequence which has not been tagged as locked has a positive recommender score based on the recommender tag described above. The positive recommender score, as discussed above, can be a thumbs-up/thumbs-down indication or a score, above which is indicative of a positive recommendation. If it is determined that the oldest partially viewed video content in the sequence has a positive recommender score, the method proceeds along path 322-YES to step 316 where oldest is incremented by one (it is determined whether the next oldest partially viewed video content in the sequence, if any, has been tagged as locked). The assumption is that the viewer, even if he/she did not indicate the partially viewed video content as locked, is likely to again view the same if it has a positive recommendation. Although, it is preferred to use this scheme in combination with prompting the viewer to determine if the partially viewed video content should be locked, it can also be used in place of. In such a situation, the recommender score would be used as a means for deciding whether the viewer would want to lock the partially viewed video content without actually prompting him/her to do so.

If it is determined that the oldest partially viewed video content does not have a positive recommendation, the method proceeds along path 322-NO to step 324, where the oldest partially viewed video content is deleted from the storage device 110. The method then proceeds to step 304 where it is determined if there is sufficient free storage space on the storage device 110 to store the desired video content. If there is, the desired video content is stored at step 306, if there is not, the method proceeds from step 308 until there is sufficient storage space to store the desired video content.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for managing a plurality of video data stored on a storage device, the method comprising:
   (a) determining whether sufficient storage space remains on the storage device to store a desired video content;
   (b) if sufficient storage space does not exist on the storage device to store the desired video content, determining whether any video content of the plurality of video data stored on the storage device has been partially viewed; and
   (c) if video content stored on the storage device has been partially viewed, deleting the partially viewed video content to make room for storage of the desired video content on the storage device.

2. The method of claim 1, wherein if it is determined that no video content stored on the storage device has been partially viewed, the method further comprises deleting video content of the plurality of video data which was first stored on the storage device until there is sufficient space on the storage device to store the desired video content.

3. The method of claim 1, further comprising storing the desired video content after deleting of the partially viewed video content.

4. The method of claim 1, further comprising repeating steps (b) and (c) until there is sufficient space on the storage device to store the desired video content.

5. The method of claim 1, further comprising tagging video content which has been partially viewed with an indication identifying the video content as partially viewed.

6. The method of claim 5, wherein the determining of whether any video content of the plurality of video data stored on the storage device has been partially viewed comprises searching the plurality of video data for the tagged video content.

7. The method of claim 5, wherein the partially viewed video content is further date tagged indicating a date on which the video content was partially viewed, wherein the deleting comprises:
   ordering the partially viewed video content in sequential order according to their corresponding date tag; and
   deleting the partially viewed video content having the oldest date tag.

8. The method of claim 7, further comprising repeating the deleting of the partially viewed particular video content having the oldest date tag until there is sufficient space on the storage device to store the desired video content.

9. The method of claim 5, wherein the partially viewed video content is further recommender tagged indicating a likelihood that a viewer would enjoy viewing the partially viewed video content, wherein the deleting comprises:
   determining whether the partially viewed video content has a positive recommendation from the recommender tag; and
   deleting the partially viewed video content having a recommender tag indicating the viewer would be unlikely to enjoy viewing thereof.

10. The method of claim 9, wherein the recommender tag indicates a recommender score and wherein the determining of whether the partially viewed video content has a positive recommendation comprises determining whether the recommender score is greater than a predetermined threshold score.

11. The method of claim 5, further comprising prompting a viewer after termination of the partially viewed video content if the partially viewed video content should be tagged not to be deleted.

12. The method of claim 11, wherein the deleting of the partially viewed video content to make room for storage of the desired video content on the storage device comprises:
   determining whether the partially viewed video content has been tagged not to be deleted; and
   deleting partially viewed video content to make room for storage of the desired video content on the storage device only if the partially viewed video content has not been tagged not to be deleted.

13. A personal video recorder comprising:
   a storage device for storing video data, the video data comprising a plurality of video content; and
   a processor for retrieving one of the plurality of video content from the storage device for viewing, determining whether the viewed video content is partially viewed, and tagging the viewed video content as being partially viewed.

14. The personal video recorder of claim 13, further comprising means for indicating storage of a desired video content, wherein the processor further determines whether there is sufficient storage space on the storage device to store the desired video content and if there is not enough storage space to store the desired video content, deletes the partially viewed video content.

15. The personal video recorder of claim 14, wherein the processor further tags the partially viewed video content with a tag indicating a date on which the video content was partially viewed, orders the partially viewed video content in sequential order according to their corresponding date tag, and if there is not enough storage space to store the desired video content, deletes the partially viewed video content having the oldest date tag.

16. The method of claim 14, wherein the processor further tags the partially viewed video content with a recommendation indicating a likelihood that a viewer would enjoy viewing the partially viewed video content, determines whether the partially viewed video content has a positive recommendation from the recommender tag, and deletes the partially viewed video content having a recommendation tag indicating the viewer would be unlikely to enjoy viewing thereof.

17. The personal video recorder of claim 14, wherein the processor further prompts a viewer after termination of the partially viewed video content if the partially viewed video content should be tagged not to be deleted and the personal video recorder further comprises means for indicating whether the partially viewed video content should be tagged not to be deleted.

18. The personal video recorder of claim 17, wherein the processor further determines whether the partially viewed video content has been tagged not to be deleted, and deletes partially viewed video content to make room for storage of the desired video content on the storage device only if the partially viewed video content has not been tagged not to be deleted.

19. A program storage device readable by machine, tangibly embodying a program of instructions executable by the machine to perform method steps for managing a plurality of video data stored on a storage device, the method comprising:

- determining whether sufficient storage space remains on the storage device to store a desired video content;
- if sufficient storage space does not exist on the storage device to store the desired video content, determining whether any video content of the plurality of video data stored on the storage device has been partially viewed; and
- if video content stored on the storage device has been partially viewed, deleting the partially viewed video content to make room for storage of the desired video content on the storage device.

20. A computer program product embodied in a computer-readable medium for managing a plurality of video data stored on a storage device, the computer program product comprising:

- computer readable program code means for determining whether sufficient storage space remains on the storage device to store a desired video content;
- computer readable program code means for determining whether any video content of the plurality of video data stored on the storage device has been partially viewed if sufficient storage space does not exist on the storage device to store the desired video content; and
- computer readable program code means for deleting the partially viewed video content to make room for storage of the desired video content on the storage device if video content stored on the storage device has been partially viewed.

* * * * *

UNITED STATES PATENT AND TRADEMARK OFFICE
CERTIFICATE OF CORRECTION

PATENT NO. : 7,260,309 B2  Page 1 of 1
APPLICATION NO. : 10/290125
DATED : August 21, 2007
INVENTOR(S) : Srinivas Gutta It is certified that error appears in the above-identified patent and that said Letters Patent is hereby corrected as shown below:

In column 8, line 46, please replace "method" with --personal video recorder--.

Signed and Sealed this

Sixteenth Day of November, 2010

David J. Kappos
*Director of the United States Patent and Trademark Office*